(12) United States Patent
Sato (10) Patent No.: US 7,563,724 B2
(45) Date of Patent: Jul. 21, 2009

(54) METHOD OF PRODUCING SEMICONDUCTOR PRESSURE SENSOR

(75) Inventor: Kimitoshi Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 255 days.

(21) Appl. No.: 11/278,756

(22) Filed: Apr. 5, 2006

(65) Prior Publication Data
US 2007/0026560 A1  Feb. 1, 2007

(30) Foreign Application Priority Data
Jul. 7, 2005  (JP) .............................. 2005-198481

(51) Int. Cl.
*H01L 21/461* (2006.01)
(52) U.S. Cl. ..................... 438/753; 438/53; 257/419
(58) Field of Classification Search ................ 438/52, 438/228, 901, 53; 257/419
See application file for complete search history.

(56) References Cited

U.S. PATENT DOCUMENTS

| | | | |
|---|---|---|---|
| 3,819,431 A * | 6/1974 | Kurtz et al. ................... 438/53 |
| 4,670,969 A * | 6/1987 | Yamada et al. ................ 438/53 |
| 5,335,550 A * | 8/1994 | Satou ............................ 73/727 |
| 6,319,743 B1 * | 11/2001 | Marchant et al. .............. 438/50 |
| 6,404,031 B1 * | 6/2002 | Hane et al. ................... 257/466 |

FOREIGN PATENT DOCUMENTS

JP  9-45928  2/1997

OTHER PUBLICATIONS

Yang et al. Effects of various ion-typed surfactants on silicon anistropic etching properties in KOH and TMAH solutions, Sensors and Actuators A 119 (2005) 271-281.*
Park, J. and Kim, M. High-Performance Fiber -Optical Fabry Perot Pressure Sensor with SiN/SiO/SiN Diaphragm. Jpn. J. Appl. Phys. vol. 38 (1999) pp. L1562-L1564.*
Zant, P. Microchip Fabrication A Practical Guide to Semiconductor Processing, Fourth Edition, McGraw-Hill p. 373.*

* cited by examiner

*Primary Examiner*—Marcos D. Pizarro
*Assistant Examiner*—Eva Yan Montalvo
(74) *Attorney, Agent, or Firm*—Oblon, Spivak, McClelland, Maier & Neustadt, P.C.

(57) ABSTRACT

A method of producing a semiconductor pressure sensor, the sensor having a diaphragm to be deformed by pressure, including: a step of preparing a semiconductor substrate having front and rear surfaces, both of the surfaces being mirror surfaces; a thermally oxidizing step of forming a thermally-oxidized film on the rear surface of the semiconductor substrate; a detecting part forming step of forming a detecting part on the front surface of the semiconductor substrate, the detecting part including a gauge resistance layer; a patterning step of forming an etching mask on the rear surface of the semiconductor substrate, the etching mask including the thermally-oxidized film; and an etching step of etching the semiconductor substrate from its rear surface with the etching mask to form a concave portion, the concave portion having a bottom portion functioning as a diaphragm.

3 Claims, 7 Drawing Sheets

METHOD OF PRODUCING SEMICONDUCTOR PRESSURE SENSOR

CROSS-REFERENCE TO RELATED APPLICATION

The disclosure of Japanese Patent Application No.2005-198481 filed on Jul. 7, 2005 including specification, drawings and claims is incorporated herein by reference in its entirety.

BACKGROUND OF THE INVENTION

1. Field of the Invention

The present invention relates to a method of producing a semiconductor pressure sensor, and more particularly, to a method of producing a diaphragm type semiconductor pressure sensor.

2. Description of the Related Art

Regarding a conventional process of producing a diaphragm type semiconductor pressure sensor, a surface pattern including a gauge resistance, a wiring ,and an aluminum pad and the like is formed on the front surface of a semiconductor substrate whose front surface is mirror surface in a front-end process. Next, in the back-end process, the thickness of the semiconductor substrate is reduced by polishing the rear surface of the semiconductor substrate, and a concave portion is formed by wet etching of the semiconductor substrate using an etching mask (silicon nitride film) which is formed on the rear surface of the semiconductor substrate by plasma CVD method, so that the bottom surface of the concave portion functions as a diaphragm (JP, 09-45928, A).

However, when the rear surface of the semiconductor substrate is polished in the back-end process, there arises a problem that damages or scratches are formed on the rear surface, so that the diaphragm surface (the bottom surface of the concave portion) becomes rough. As the adhesion of the etching mask for forming the concave portion is not good, there arises another problem that the control of the shape of the diaphragm (concave portion) with high dimensional accuracy is difficult.

SUMMARY OF THE INVENTION

An object of the present invention is to provide a method of producing a diaphragm type semiconductor pressure sensor, according to which a diaphragm having a flat surface can be formed with high dimensional accuracy.

The present invention is directed to a method of producing a semiconductor pressure sensor, the sensor having a diaphragm to be deformed by pressure, including: a step of preparing a semiconductor substrate having front and rear surfaces, both of the surfaces being mirror surfaces; a thermally oxidizing step of forming a thermally-oxidized film on the rear surface of the semiconductor substrate; a detecting part forming step of forming a detecting part on the front surface of the semiconductor substrate, the detecting part having a gauge resistance layer; a patterning step of forming an etching mask on the rear surface of the semiconductor substrate, the etching mask having the thermally-oxidized film; and an etching step of etching the semiconductor substrate from its rear surface with the etching mask to form a concave portion, the concave portion having a bottom portion functioning as a diaphragm.

As shown previously, according to a producing method of the present invention, a diaphragm type semiconductor pressure sensor including a diaphragm with a flat surface formed with high dimensional accuracy can be provided.

DETAILED DESCRIPTION OF THE PREFERRED EMBODIMENTS

Embodiment 1

Figure 1:
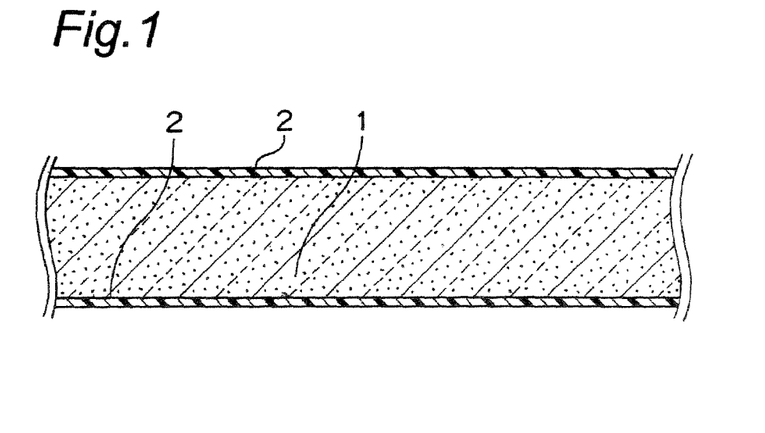
FIGS. 1-3 show cross sectional views of the step of producing a semiconductor pressure sensor according to the embodiment 1 of the present invention.
Figure 2:
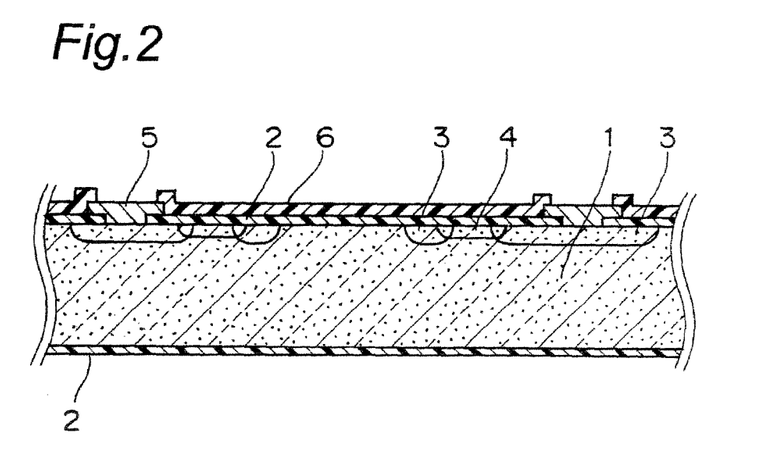
Figure 3:
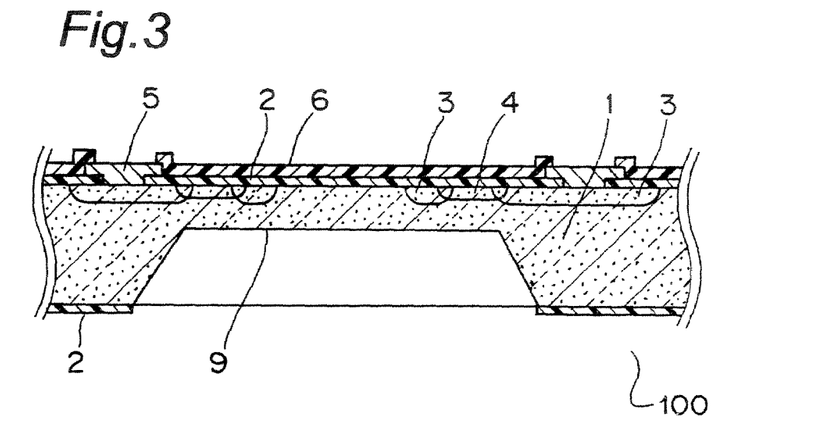

FIGS. 1 through 3 show cross sectional views of the step of producing a semiconductor pressure sensor according to the embodiment 1 generally denoted at 100. The producing steps include the following steps 1 through 3.

Step 1: As shown in FIG. 1, a semiconductor substrate 1 of n-type silicon is prepared. Both of the front and rear surfaces of the semiconductor substrate 1 are polished to mirror surfaces. The thickness of the semiconductor substrate 1 is 400 μm for instance, which is approximately equal to the final thickness of the diaphragm type semiconductor pressure sensor 100.

Next, a thermally-oxidized film (silicon oxide film) 2 is formed on the front and rear surfaces of the semiconductor substrate 1 by thermal oxidation method.

Step 2: As shown in FIG. 2, a detection part of the semiconductor pressure sensor is formed on the front surface of the semiconductor substrate 1. Specifically, a p type wiring layer (first diffused layer) 3 and a p type gauge resistance layer (second diffused layer) 4 whose impurity concentration is lower than that of the wiring layer 3 (namely, whose resistance is higher than that of the wiring layer 3) are formed by using a thermal diffusion method for instance. In the detection part, the gauge resistance layers 4 are connected by the wiring layer 3 to fabricate a Wheatstone bridge like a general diaphragm type semiconductor pressure sensor.

Next, a pad electrode 5 of aluminum is formed to be connected to a wiring layer 3 by using a evaporation method for instance. Then, a glass coat film 6 is formed as a passivation film. It is noted that the steps mentioned above (steps for forming the detection part) is called a front-end process, the process described hereinafter (steps for forming the diaphragm) is called a rear-end process.

Step 3: As shown in FIG. 3, the thermally-oxidized film 2 formed on the rear surface is patterned to form an etching mask. The location of the etching mask is aligned with that of the gauge resistance layer 4 on the front surface. Hereby, the gauge resistance layer 4 is disposed near the edge of the diaphragm 9.

Next, the semiconductor substrate 1 is etched to form a concave portion by using the etching mask, so that the semiconductor substrate 1 left at the bottom of the concave portion functions as a diaphragm 9. An aqueous THAH (tetramethyl ammonium hydroxide) solution or the like whose etching rate for the thermally-oxidized film 2 is low (2 μm/min. for instance) is used for etching the semiconductor substrate 1 on the ground that the thickness of the thermally-oxidized film 2 is thin.

Through these steps, a diaphragm type semiconductor pressure sensor 100 shown in FIG. 3 is completed. It is noted that a polishing step at which the rear surface of the semiconductor substrate 1 is polished to reduce its thickness is not needed. It is because that a semiconductor substrate whose front and rear surfaces have been polished to mirror surfaces and whose thickness is 400 μm for instance is preliminary prepared in this method.

As described above, in the producing method according to the embodiment 1, the diaphragm 9 can be formed only by using the etching step of the rear mirror surface without using a polishing step. Hereby a surface with good flatness can be obtained as a surface of the diaphragm 9 (a bottom surface of the concave portion). Also, as the etching mask is made of the thermally-oxidized film 2, the adhesiveness between the etching mask and the semiconductor substrate 1 becomes strong, and thereby a high-precision wet etching can be obtained. Furthermore, as a polishing step of the rear surface is not needed, reducing the producing steps and producing costs can be obtained.

In the diaphragm type semiconductor pressure sensor 100, the diaphragm 9 is deformed or bent when a pressure is applied to the diaphragm 9. As a result, the resistance of the gauge resistance layer 4 formed near the edge of the diaphragm 9 changes. Consequently, the value of the applied pressure can be detected by gauging the change of the resistance.

Although the p type wiring layer 3 and gauge resistance layer 4 are formed in the n type semiconductor substrate 1 in the present embodiment 1, n type wiring layer 3 and gauge resistance layer 4 may be formed in a p type semiconductor substrate 1 (The same modifications can be applied to the following embodiments 2 through 5).

Embodiment 2

Figure 4:
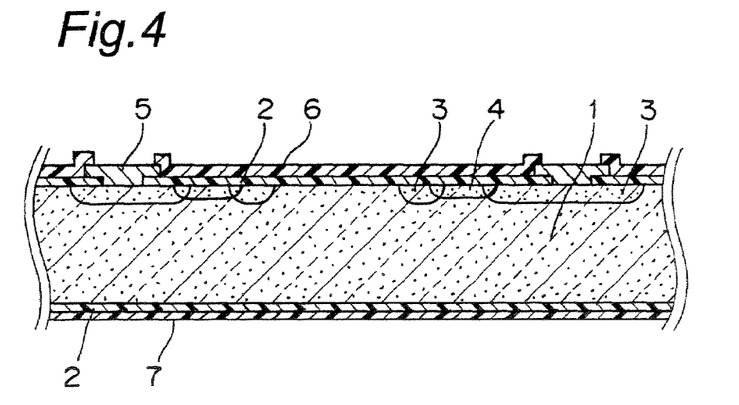
FIGS. 4-6 show cross sectional views of the step of producing a semiconductor pressure sensor according to the embodiment 2 of the present invention.
Figure 5:
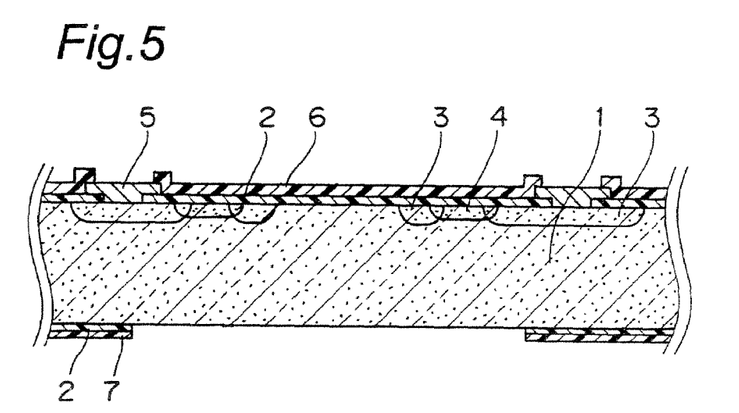
Figure 6:
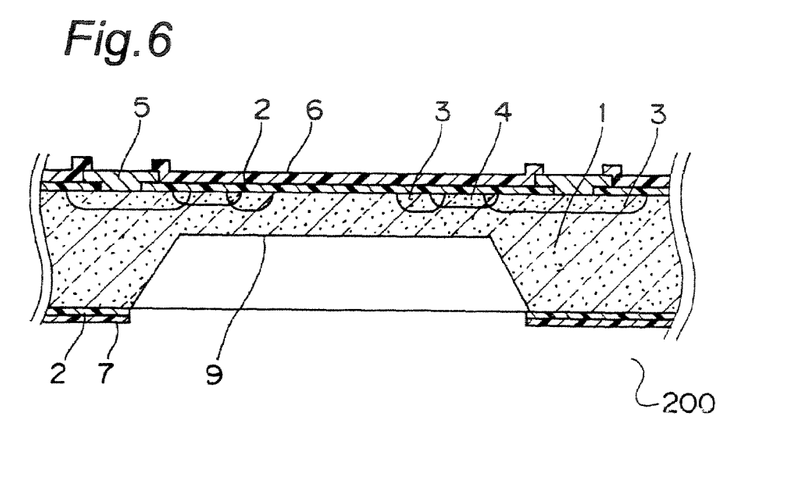

FIGS. 4 through 6 show cross sectional views of the step of producing a semiconductor pressure sensor according to the embodiment 2 generally denoted at 200. The producing steps include the following steps 1 through 3.

Step 1: As shown in FIG. 4, the detecting portion of the semiconductor pressure sensor 200 is formed on the front surface of the semiconductor substrate 1, and the thermally-oxidized film 2 is formed on the rear surface of the semiconductor substrate 1 by using the same steps 1 and 2 as those described in the embodiment 1. Then, by using a plasma CVD method for instance, a plasma nitride film (silicon nitride film) 7 is formed on the rear surface of the semiconductor substrate 1. As the plasma nitride film 7 can be formed at low temperature, a thermal diffusion of impurities in the gauge resistance layer 4 and the like does not arise in the detecting portion.

Step 2: As shown in FIG. 5, the thermally-oxidized film 2 and the plasma nitride film 7 formed on the rear surface of the semiconductor substrate 1 during the step 1 are patterned to form an etching mask. The location of the etching mask is aligned with that of the gauge resistance layer 4 on the front surface.

In the patterning step for fabricating the etching mask, the plasma nitride film 7 is etched by using a dry etching, on the other hand, the thermally-oxidized film 2 is etched by using a wet etching. Hereby, a damage of the rear surface of the semiconductor substrate 1 formed by a dry etching can be prevented.

Step 3: The concave portion is formed by using a wet etching of the semiconductor substrate 1 with the etching mask, so that the semiconductor substrate 1 left at the bottom of the concave portion functions as a diaphragm 9. In the step 3, an aqueous KOH solution having a good controllability for etching can be used as an etching solution, because the plasma nitride film 7 is formed to cover the thermally-oxidized film 2. Through these steps, the diaphragm type semiconductor pressure sensor 200 shown in FIG. 6 is completed.

As described above, in the producing method according to the embodiment 2, the same effects as those described in the embodiment 1 can be obtained, and additionally a high-precision wet etching can be performed by using an aqueous KOH solution as an etching solution, thereby the high-precision diaphragm 9 can be formed.

Also, even where a damage is formed on the thermally-oxidized film 2 formed on the rear surface during a front-end process, a flat surface can be obtain by forming a plasma nitride film 7 on the thermally-oxidized film 2 so that the damage is covered by the plasma nitride film 7.

Embodiment 3

FIGS. 7 through 11 show cross sectional views of the step of producing a semiconductor pressure sensor according to the embodiment 3 generally denoted at 300. The producing steps include the following steps 1 through 5.

Figure 7:
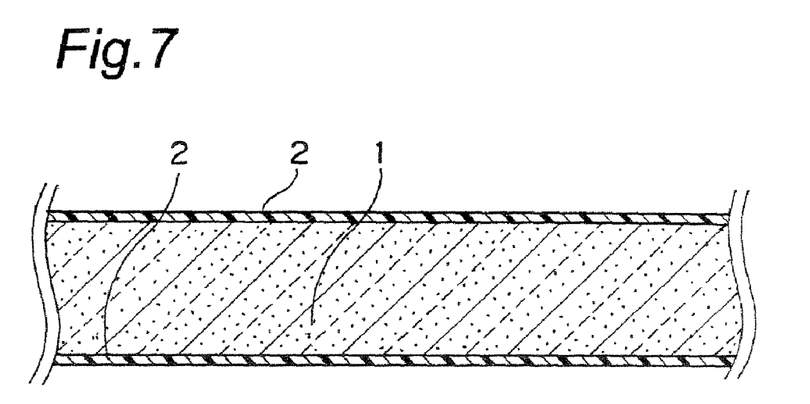
FIGS. 7-11 show cross sectional views of the step of producing a semiconductor pressure sensor according to the embodiment 3 of the present invention.

Step 1: As shown in FIG. 7, the thermally-oxidized films 2 are formed on the front and rear surfaces of the semiconductor substrate 1 by thermal oxidation method. Both of the front and rear surfaces of the semiconductor substrate 1 are mirror surfaces and the thickness of the substrate 1 is 400 μm.

Figure 8:
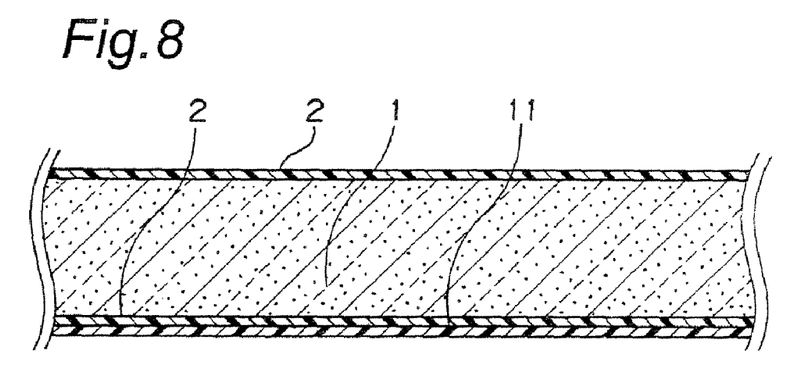

Step 2: As shown in FIG. 8, a nitride film (silicon nitride film) 11 is formed on the thermally-oxidized film 2 on the rear surface by using a thermal CVD method. The nitride film 11 may be additionally formed on the front surface.

Figure 9:
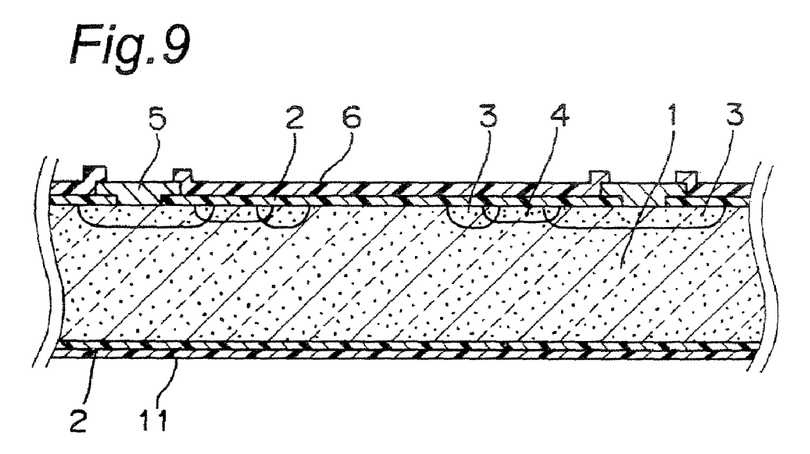

Step 3: As shown in FIG. 9, the detection part of the semiconductor pressure sensor is formed on the front surface of the semiconductor substrate 1. During this step, the rear surface is covered by the nitride film 11 functioning as a passivation film.

Figure 10:
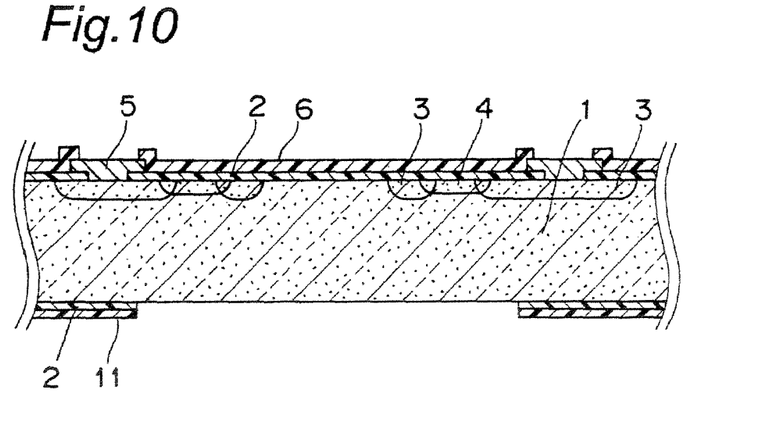

Step 4: As shown in FIG. 10, the thermally-oxidized film 2 and the nitride film 11 formed on the rear surface are patterned to form an etching mask. The location of the etching mask is aligned with that of the gauge resistance layer 4 on the front surface.

Figure 11:
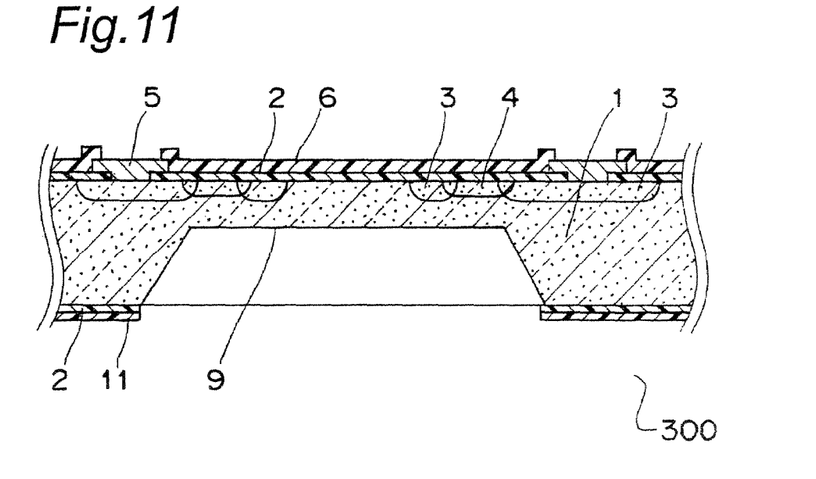

Step 5: As shown in FIG. 11, the semiconductor substrate 1 is etched to form the concave portion by using the etching mask, so that the semiconductor substrate 1 left at the bottom of the concave portion functions as a diaphragm 9. An aqueous KOH solution or the like is used as an etching solution.

Through these steps, the diaphragm type semiconductor pressure sensor 300 shown in FIG. 11 is completed.

As described above, in the producing method according to the embodiment 3, the same effects as those described in the embodiment 2 can be obtained, and additionally damaging the thermally-oxidized layer 2 during the detection part forming step can be prevented because the thermally-oxidized layer 2 on the rear surface is covered by the nitride layer 11 during the formation of the detecting part on the front surface. Consequently, the adhesiveness between the etching mask and the semiconductor substrate 1 becomes strong, and thereby the diaphragm 9 can be made with a high degree of accuracy.

Furthermore, as the nitride film 11 is formed in advance, the producing process can be simplified than the process in which the nitride film 11 is formed in the post-process.

Embodiment 4

FIGS. 12 through 15 show cross sectional views of the step of producing a semiconductor pressure sensor according to the embodiment 4 generally denoted at 400. The producing steps include the following steps 1 through 4.

Figure 12:
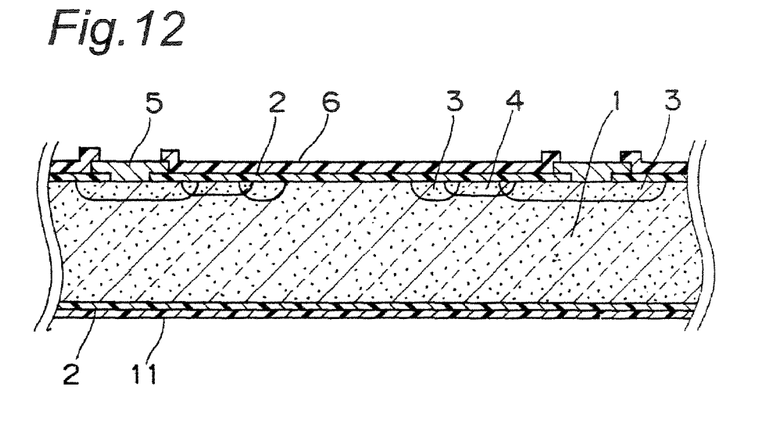
FIGS. 12-15 show cross sectional views of the step of producing a semiconductor pressure sensor according to the embodiment 4 of the present invention.

Step 1: As shown in FIG. 12, by using the same steps as steps 1 through 3 of the embodiment 3, the thermally-oxidized film 2 is formed on both sides of a semiconductor substrate 1, and the nitride film 11 is formed on the thermally-oxidized film 2 on the rear surface, and then the detection part is formed on the front surface of the semiconductor substrate 1.

Figure 13:
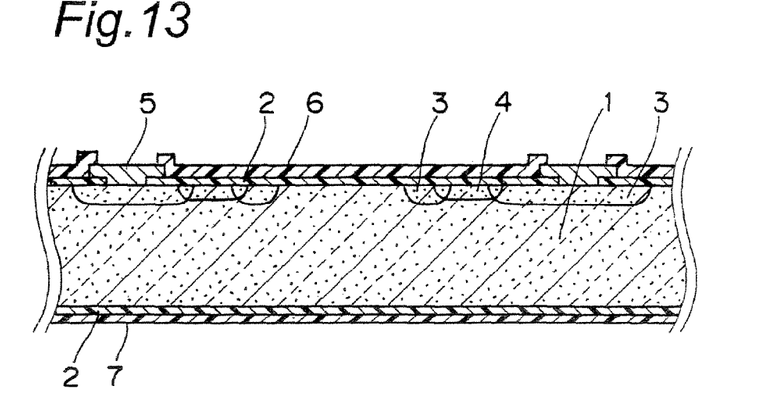

Step 2: As shown in FIG. 13, after removing the nitride film 11 on the rear surface, the plasma nitride film 7 is formed instead of the nitride film 11 by using a plasma CVD method. The temperature at which the plasma nitride film 7 is formed can be lower than the temperature at which the nitride film 11 is formed.

Figure 14:
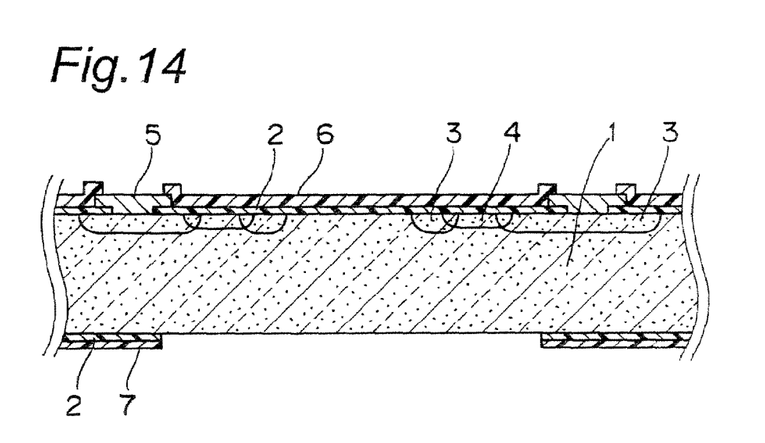

Step 3: As shown in FIG. 14, the thermally-oxidized film 2 and the nitride film 7 on the rear surface are patterned to form an etching mask. The location of the etching mask is aligned with that of the gauge resistance layer 4 on the front surface.

Figure 15:
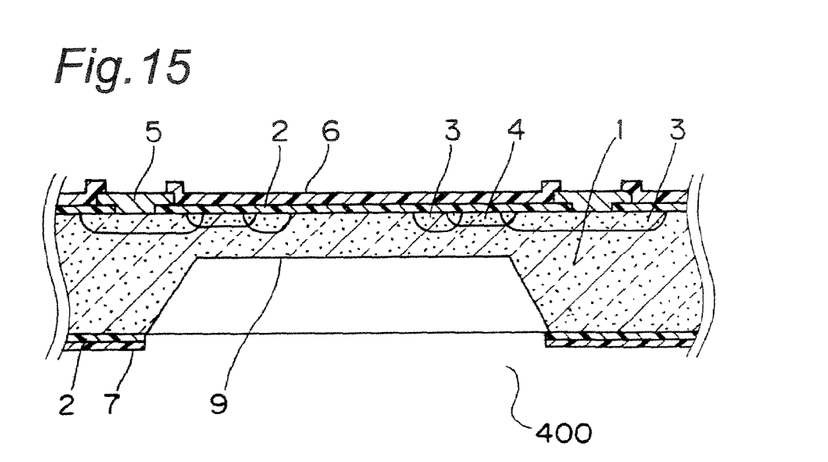

Step 4: As shown in FIG. 15, the semiconductor substrate 1 is etched to form the concave portion by using the etching mask, so that the semiconductor substrate 1 left at the bottom of the concave portion functions as the diaphragm 9. An aqueous KOH solution or the like is used as an etching solution.

Through these steps, the diaphragm type semiconductor pressure sensor 400 shown in FIG. 15 is completed.

As described above, in the producing method according to the embodiment 4, the nitride film 11 formed on the rear surface is removed and then the plasma nitride film 7 is formed instead of the nitride film 11. Even where a damage is formed on the nitride film 11 during a detection part forming step, the plasma nitride film 7 with a flat surface is newly formed, thereby the etching mask without a damage can be obtained. Consequently, the diaphragm 9 can be made with a high degree of accuracy.

Embodiment 5

FIGS. 16 through 20 show cross sectional views of the step of producing a semiconductor pressure sensor according to the embodiment 5 generally denoted at 500. The producing steps include the following steps 1 through 5.

Figure 16:
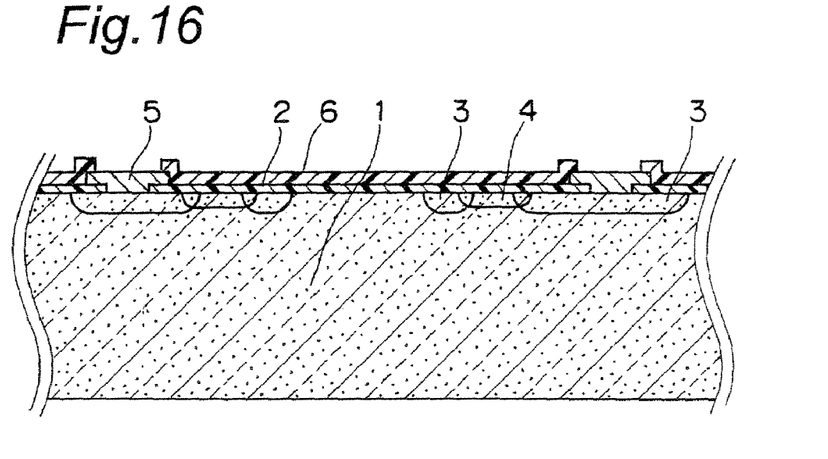
FIGS. 16-20 show cross sectional views of the step of producing a semiconductor pressure sensor according to the embodiment 5 of the present invention.

Step 1: As shown in FIG. 16, the semiconductor substrate 1 of n type silicon is prepared. Only the front surface is processed to a mirror surface. The thickness of the semiconductor substrate 1 is 625 μm for instance, and the substrate 1 is polished to be 400 μm in thickness during the following step 2 (polishing step). Next, the detection part is formed on the front surface of the semiconductor substrate 1 during the above-mentioned step.

Figure 17:
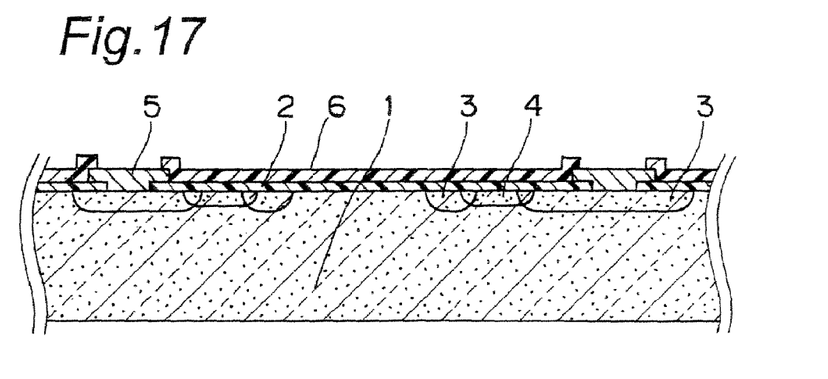

Step 2: As shown in FIG. 17, the semiconductor substrate 1 is polished from the rear surface to be 400 μm in thickness. The rear surface becomes a mirror surface.

Figure 18:
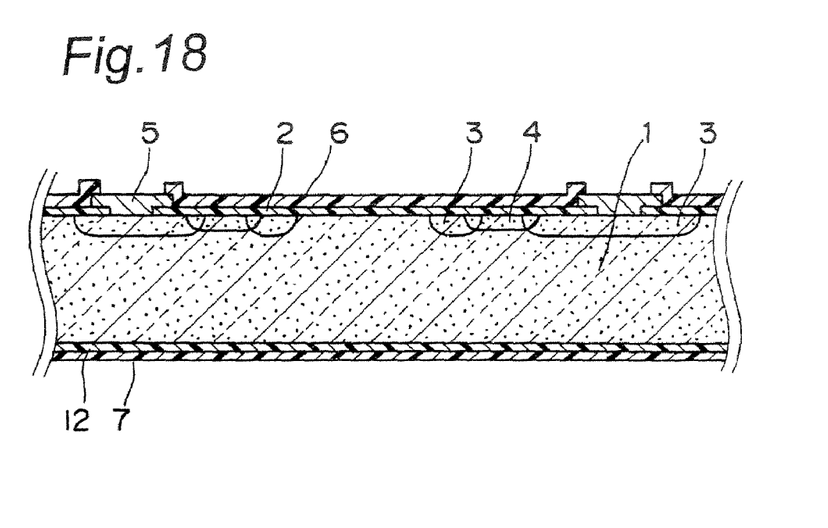

Step 3: As shown in FIG. 18, an oxide film 12 is formed on the rear surface of the semiconductor substrate 1 by using an LTO (Low Temperature Oxidation) method, and then the plasma nitride film 7 is formed on it by using a plasma CVD method. As the LTO method and the CVD method are processed in relatively low temperature, a thermal diffusion of impurities in the gauge resistance layer 4 and the like does not arise in the detecting portion.

Figure 19:
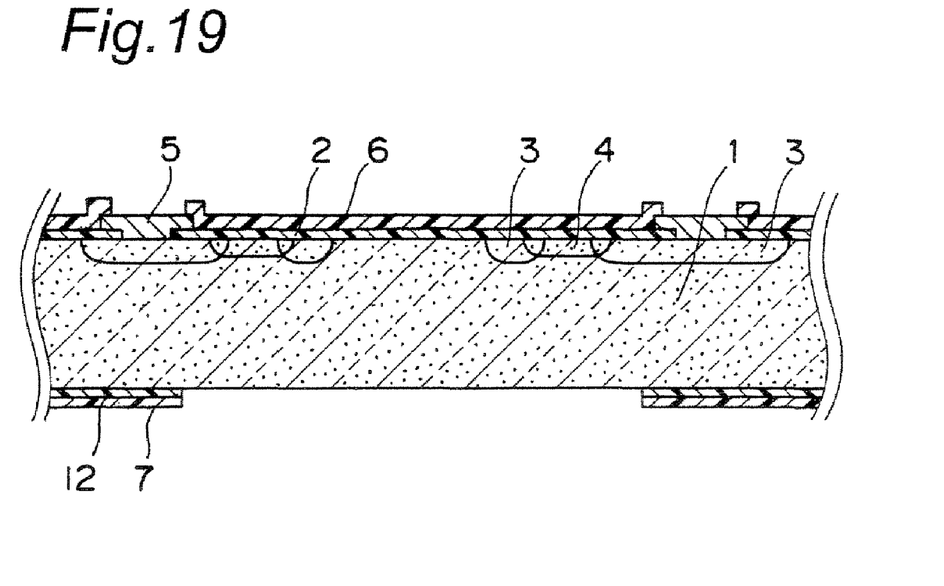

Step 4: As shown in FIG. 19, the oxide film 12 and the plasma nitride film 7 on the rear surface is patterned to form an etching mask. The location of the etching mask is aligned with that of the gauge resistance layer 4 on the front surface.

Figure 20:
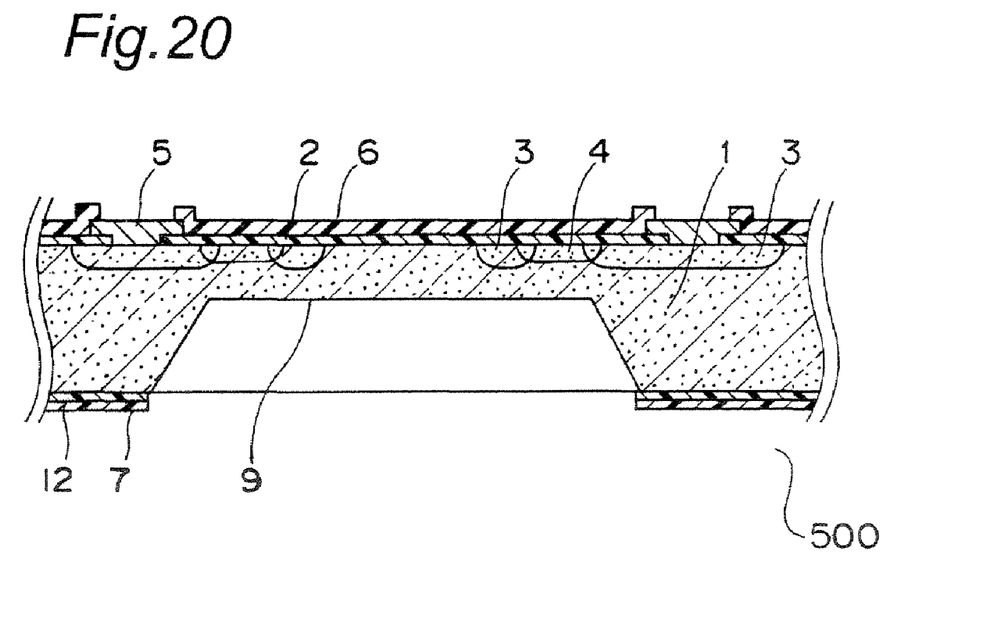

Step 5: As shown in FIG. 20, the semiconductor substrate 1 is etched to form the concave portion by using the etching mask, so that the semiconductor substrate 1 left at the bottom of the concave portion functions as the diaphragm 9. An aqueous KOH solution or the like is used as an etching solution.

Through these steps, the diaphragm type semiconductor pressure sensor 500 shown in FIG. 20 is completed.

As described above, in the producing method according to the embodiment 5, even where a damage is formed on the rear surface during the polishing step of the rear surface (step 2), the oxide film 12 with the flat surface is formed to cover the damage. Consequently, the etching mask with the flat surface is obtained and the diaphragm 9 can be formed with a high degree of accuracy, even where the rear surface of the semiconductor substrate 1 is damaged to have asperities.

What is claimed is:

1. A method of producing a semiconductor pressure sensor, the sensor having a diaphragm to be deformed by pressure, comprising:

preparing a semiconductor substrate having front and rear surfaces, both of the surfaces being mirror surfaces, the semiconductor substrate being a single layer;

forming a thermally-oxidized film on the rear surface of the single layer semiconductor substrate;

forming a detecting part in the front surface of the single layer semiconductor substrate, the detecting part comprising a gauge resistance layer;

forming an etching mask on the rear surface of the single layer semiconductor substrate, the etching mask comprising the thermally-oxidized film;

etching the single layer semiconductor substrate from its rear surface with the etching mask without going through the single layer semiconductor substrate to form a concave portion, the concave portion having a bottom portion functioning as a diaphragm, forming a nitride film on the thermally-oxidized film disposed on the rear surface of the single layer semiconductor substrate after forming the thermally oxidized film; and removing the nitride film on the thermally-oxidized film and forming a plasma nitride film instead of the nitride film after forming the detecting part, wherein the forming of the etching mask comprises forming a two-layer etching mask made of the thermally-oxidized film and the plasma nitride film.

2. The method according to claim 1, wherein the etching comprises:

etching the single layer semiconductor substrate by an aqueous THAH solution using the thermally-oxidized film as an etching mask.

3. A method of producing a semiconductor pressure sensor, the sensor having a diaphragm to be deformed by pressure, comprising:

preparing a semiconductor substrate having front and rear surfaces, both of the surfaces being mirror surfaces;

forming a thermally-oxidized film on the rear surface of the semiconductor substrate;

forming a nitride film on the thermally-oxidized film disposed on the rear surface of the semiconductor substrate after forming the thermally-oxidized film;

forming a detecting part on the front surface of the semiconductor substrate, the detecting part comprising a gauge resistance layer;

removing the nitride film on the thermally-oxidized film and forming a plasma nitride film instead of the nitride film after forming the detecting part, forming an etching mask on the rear surface of the semiconductor substrate, the etching mask comprising the thermally-oxidized film; and etching the semiconductor substrate from its rear surface with the etching mask to form a concave portion, the concave portion having a bottom portion functioning as a diaphragm, wherein the forming of the etching mask comprises forming a two-layer etching mask made of the thermally-oxidized film and the plasma nitride film.

* * * * *